Figure 1:
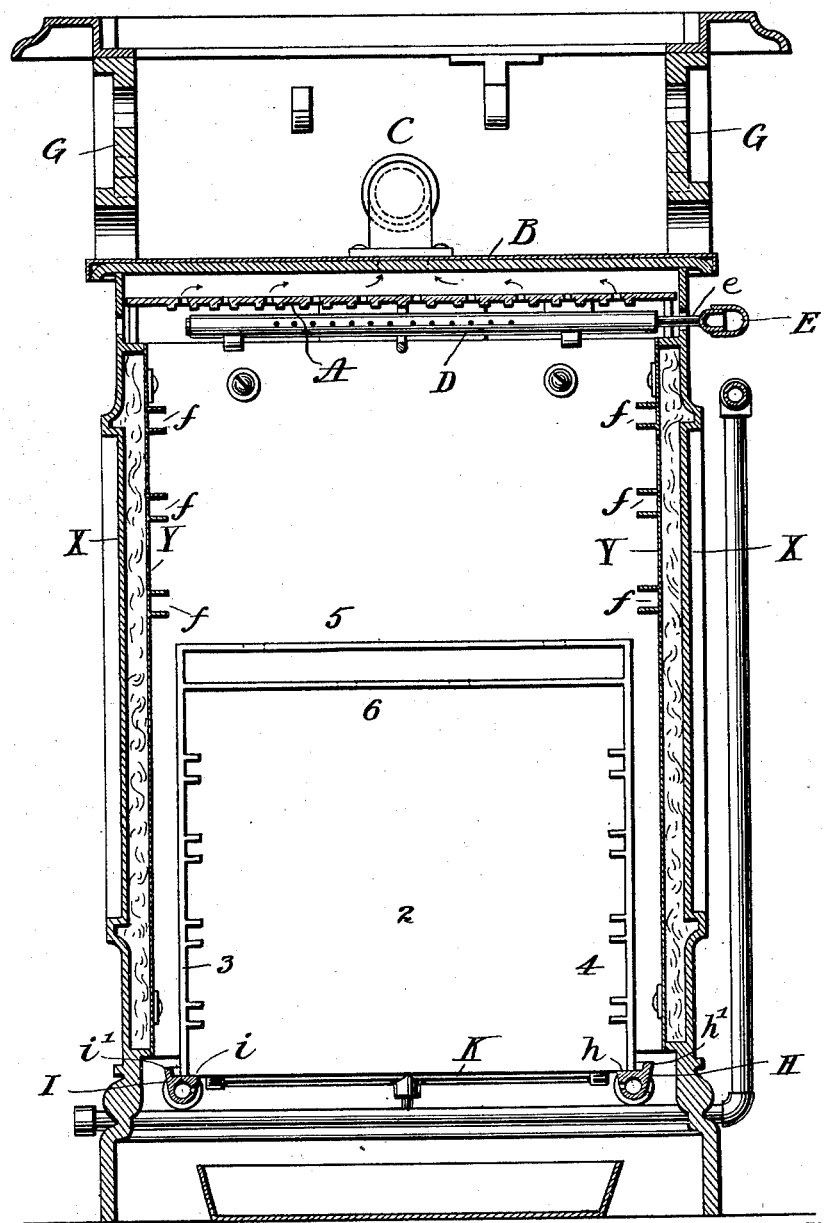

No. 683,331. Patented Sept. 24, 1901.
E. W. T. RICHMOND.
GAS COOKING APPARATUS.
(Application filed Dec. 14, 1900.)

(No Model.) 2 Sheets—Sheet 1.

WITNESSES: Frank S. Ober. M. W. Harrison.

INVENTOR Edmond W. T. Richmond

BY Baldwin, Davidson & Wight

ATTORNEYS

No. 683,331. Patented Sept. 24, 1901.
E. W. T. RICHMOND.
GAS COOKING APPARATUS.
(Application filed Dec. 14, 1900.)
(No Model.) 2 Sheets—Sheet 2.

WITNESSES:
Frank A. Ober
W. W. Harrison

INVENTOR
Edmund W. T. Richmond
BY
Baldwin, Davidson & Wight
ATTORNEYS

UNITED STATES PATENT OFFICE.

EDMOND W. T. RICHMOND, OF ROMFORD, ENGLAND.

GAS COOKING APPARATUS.

SPECIFICATION forming part of Letters Patent No. 683,331, dated September 24, 1901.

Application filed December 14, 1900. Serial No. 39,855. (No model.)

*To all whom it may concern:*

Be it known that I, EDMOND W. T. RICHMOND, a subject of the Queen of Great Britain, residing at Summercourt, Romford, Essex county, England, have invented certain new and useful Improvements in Gas Cooking Apparatus, of which the following is a specification.

This invention relates to a separable, supplementary, or additional oven adapted to be placed within the oven of a gas cooking-stove. It is applicable to that class of cookers in which the burners are located at the bottom of the oven.

In the drawings is shown a gas-cooker having a single rather high oven like or similar to that disclosed in my application, Serial No. 39,854, filed December 14, 1900. The oven of such a cooker may have a burner at the top, two bottom burners at the sides, and one bottom burner at the rear. The supplementary oven herein discolsed is designed to coöperate with the bottom burners and preferably with the side ones only. It is so constructed as to be adapted to be placed in the oven of the cooker, in the lower part thereof, when desired for the baking of some article of food, as bread or biscuit, not requiring the heating and use of the entire oven and may readily be removed. While the supplementary oven is in use the upper part of the oven may be utilized for some other purpose.

Figure 2:
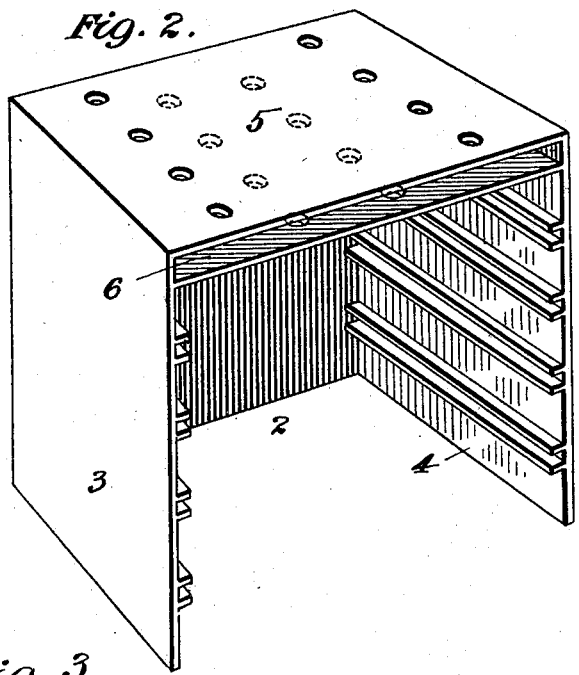
Figure 3:
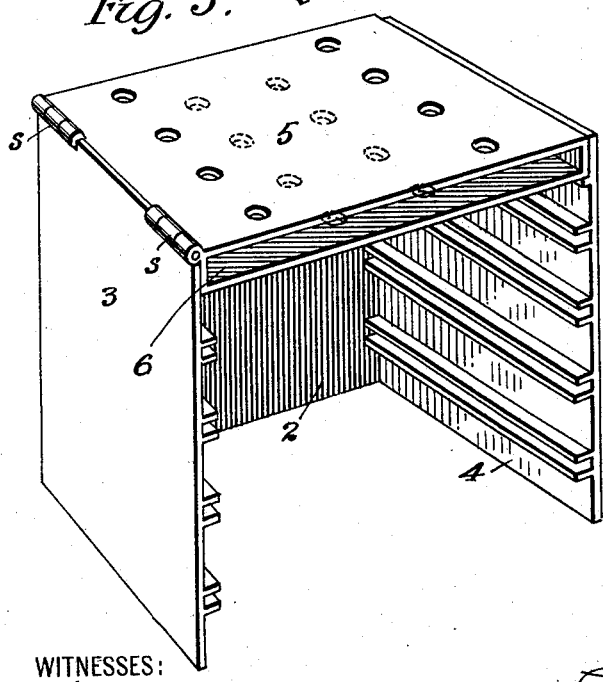
Figure 4:
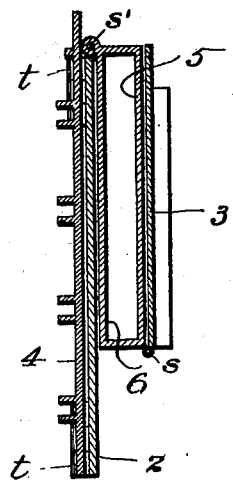

In the accompanying drawings, Figure 1 is a vertical transverse section through a gas-cooker having a single relatively high oven containing one of my supplemental ovens; Fig. 2, a perspective view of one form of the supplementary oven; Fig. 3, a like view of another form capable of being "knocked down" or folded up, and Fig. 4 shows the latter oven folded.

Figure 1 indicates a gas-cooker having double walls X Y, the intervening space between which is to be packed with mineral wool, asbestos, or other suitable heat-insulating material.

A is a cast-iron false top through apertures in which the products of combustion pass, and thence between A and the cover B to the outlet C. The burner D beneath the false top, supplied with gas from the gas-bar E through the nipple $e$ and taking air around the nipple, may be used for grilling.

The runners or ways in or on the sides $ff$ of the oven for supporting the grids or shelves for the cooking utensils are shown in Fig. 1. On the top of the casing at each side is a bracket G, which supports the hot plate or upper frame in which grilling and boiling burners are mounted, all as is well understood. At the bottom of the oven three burners are shown, one, H, at the right side, another, I, at the left side, and a third, K, at the rear, all to be supplied with gas and air, as is well understood. The upper burner is shown as removably mounted, and the other three burners may be similarly mounted.

The supplementary oven is composed of a rear wall 2, side walls 3 4, and a double top 5 6 and is open at the bottom and front. The inner faces of the side walls are provided with runners or ways to receive grids or cooking-pans. The products of combustion pass out at the top through apertures in the plate 6, and thence through the apertures in the plate 5. The apertures in the two plates are staggered or non-coincident, so as to retain for a time the products of combustion between the plates and keep the top of the oven warm. This subsidiary oven may be passed through the oven-door and into the position shown in Fig. 1, in which the rear wall 2 is in front of the rear burner K and the side walls 3 4 rest on the burners H I. To afford a suitable and appropriate base for the supplementary oven, the burners H I, which are of cast-iron, are formed with flat tops $h$ $i$ and a vertical rib or flange $h'$ $i'$ along the outer edge. Such an oven may readily be slipped into place and with equal facility removed when the required purpose of its use is accomplished.

For the convenient stowage of the supplementary oven, either for transportation or in the household, it is constructed as shown in Figs. 3 and 4. The side 3 is hinged at $s$ $s$ to the upper edge of the double top—*i. e.*, to the edge of the plate 5—and may be folded over upon the top. The side 4 is hinged to the back plate at $t$ $t$ and may be folded back upon it, when the double top may be folded down upon the face of the back plate. The back 2 is hinged to the part 6 of the top at *s'*. The oven when so folded is shown in Fig. 4.

A supplementary oven of the general character shown and having the capacity of being used as described may be used in connection with gas-cookers differing from that indicated in the drawings and briefly described and made in somewhat different form without departing from the spirit of the invention.

I claim as my invention—

1. The combination with a fixed or stationary gas-cooker oven and a supplementary oven therein, and removable therefrom, comprising top, rear and side walls, and open at front and bottom, and having an oven-space above the top thereof in the cooker-oven, a gas-burner for heating the main oven, arranged outside of the supplementary oven, and a gas-burner discharging into the supplementary oven.

2. The combination with a gas-cooker oven, of a supplementary oven therein, and removable therefrom, comprising top, rear and side walls, and open at front and bottom, and provided with an oven-space above it in the cooker-oven, a gas-burner arranged at the top of said space in the cooker-oven, and gas-burners arranged at the bottom of the supplementary oven and discharging thereinto.

3. The combination of a fixed or stationary gas-cooker oven and a supplementary oven arranged therein, having a space between its rear end and the back of the main oven, and space on each side thereof, as well as a large oven-space above it in the main oven, gas-burners discharging directly into the open bottom of the supplementary oven, a gas-burner in rear of the supplementary oven, discharging directly into the main oven, and a gas-burner at the top of the main oven.

4. The combination of a gas-cooker oven, of the bottom side burners formed with seats on their upper surfaces to receive the lower edges of the side walls of a supplementary oven, and a supplementary oven within the main oven open at front and bottom, and having top and side walls, the latter of which rest upon the seats of the side burners.

5. A supplementary oven for gas-stoves having a double top with one side hinged to the top so as to fold over upon the upper surface thereof, a back hinged to the top so as to fold over the inner surface thereof, and another side hinged to the back so as to fold over upon the outer side thereof.

In testimony whereof I have hereunto subscribed my name.

EDMOND W. T. RICHMOND.

Witnesses:
KATHARINE MACMAHON,
EDWARD C. DAVIDSON.